March 1, 1960 V. ANDRIULIS 2,927,236

TELEVISION PICTURE TUBE

Filed Oct. 21, 1955 2 Sheets-Sheet 1

INVENTOR.
Vytautas Andriulis
BY
Thiess, Olson, Mecklenburger, von Holst and Coltman
Attorneys March 1, 1960 V. ANDRIULIS 2,927,236

TELEVISION PICTURE TUBE

Filed Oct. 21, 1955

2 Sheets-Sheet 2

INVENTOR.
Vytautas Andriulis
BY
Thiess, Olson, Mecklenburger, von Holst and Coltman
Attorneys United States Patent Office 2,927,236

Patented Mar. 1, 1960

2,927,236

TELEVISION PICTURE TUBE

Vytautas Andriulis, Chicago, Ill., assignor to Scientific Laboratory Developments, Inc., Chicago, Ill., a corporation of Illinois Application October 21, 1955, Serial No. 541,910

10 Claims. (Cl. 313—77)

This invention relates to an improved cathode ray tube and more particularly to an improved television picture tube having a unique combination of means for beam focusing, acceleration, and deflection.

The system presently approved for the transmission of color television pictures in the United States includes the transmission of a composite signal including sound or audio intelligence, brilliance, or black and white visual intelligence, and hue or color intelligence. All of this information is transmitted continuously whereby no absolute mode of sequential color sampling is required by the nature of the transmission. In a color transmission receiver, the brilliance and color information may be combined in various known manners to reduce the information into three independent color channels having continuous signals characteristic of the three selected fundamental colors, red, green and blue.

These signals may be utilized to produce three complete, independent pictures in the three respective colors which may be combined optically to produce a single multicolored picture. Such systems have generally proven unsatisfactory because of optic problems and therefore it has become conventional to create a multicolor picture in a single cathode ray tube by the construction of a phosphorescent screen having a matrix of spots or lines which luminesce in the three fundamental colors. The spacing of the color areas is sufficiently close so that the eye is unable to resolve the individual colors and thus integrates the matrix into a single multicolor picture. Each information channel controls the luminescence of certain portions of the picture tube screen to produce a particular color pattern, and the combined effect of the three channels is a complete color picture containing a satisfactory range of hues and brilliance for satisfactory color viewing. Systems heretofore proposed for utilizing the three information channels of a color signal in a single picture tube have all included the generation of three independent angularly disposed electron beams which impinge upon a masked phosphorescent screen having a matrix of dots or lines in the desired color combinations.

The three independent electron beams in one particular prior art picture tube are generated by three completely independent spaced electron guns producing convergent electron beams, each including a source of electrons, control electrode, accelerating electrodes, and focusing electrodes, and a deflection system which may be common to the three guns. In such three-gun constructions, each gun is energized with a continuous color signal representing one of the colors, but the mask breaks the beam up into spaced beams which will impinge only on the spaced dots of the one particular color. Such tubes are expensive and relatively inefficient.

In the alternative, picture tubes have heretofore been proposed which include a system for utilizing a single beam of electrons commutated or periodically switched and deflected into three angularly disposed streams divergent along radials displaced at 120° about the beam axis.

The three streams are subsequently accelerated, focused and re-deflected to recombine at substantially a common spot in front of the phosphorescent screen. There a mask functions as described with respect to the three-gun tube whereby the beams approaching from the three separate directions will pass through common apertures in the mask, and, because of their divergent paths, will impinge on spaced phosphorescent dots in the three basic colors. In such single gun systems the signal on the control grid must sequentially represent the color signal of the three color channels, and this sequential sampling must be coordinated with the switching of the beam between the three angularly disposed paths. All of these systems have failed to perform with complete satisfaction due to technical difficulties in aligning the various optics, guns or deflection systems which must be accurately oriented in a nonplanar or spatial relationship producing a plurality of variables which must be delicately interrelated to produce the necessary color registry and balance.

It is therefore one important object of this invention to provide a cathode ray tube having improved systems for beam focusing and deflection.

It is still another object of this invention to provide an improved picture tube having a unique beam deflection system.

It is still another object of this invention to provide an improved television picture tube having a beam deflection system especially adapted for the reproduction of images in color.

It is a further object of this invention to provide an improved television picture tube employing a unique beam focusing means.

It is still another object of this invention to provide an improved television picture tube employing a focusing system in the low voltage region.

It is a further object of this invention to provide an improved television picture tube adapted for the reproduction of images in color whereby a constant or low frequency color deflection is utilized in the high voltage region.

It is still a further object of this invention to provide an improved television picture tube employing a planar beam deflection system.

It is another object of this invention to provide an improved television picture tube especially adapted for the reproduction of images in color which is simple in design and capable of mass production and expedient adjustment.

Further and additional objects of the invention will become manifest from a consideration of this specification, the accompanying drawings and the appended claims.

In one form of this invention a television picture tube is provided for the reproduction of images in color wherein a source of high velocity electrons is disposed in an evacuated envelope having a glass face whereby a beam of such electrons is directed at a spaced phosphorescent screen within said envelope in such a manner as to produce an image in color. More particularly, means is provided for first focusing and then accelerating and deflecting in a single plane a beam of electrons which will pass through an apertured mask to impinge upon a screen having a plurality of adjacent phosphorescent areas of three fundamental colors.

For a more complete understanding of this invention reference will now be made to the accompanying drawings wherein.

Figures 1, 2, 3:
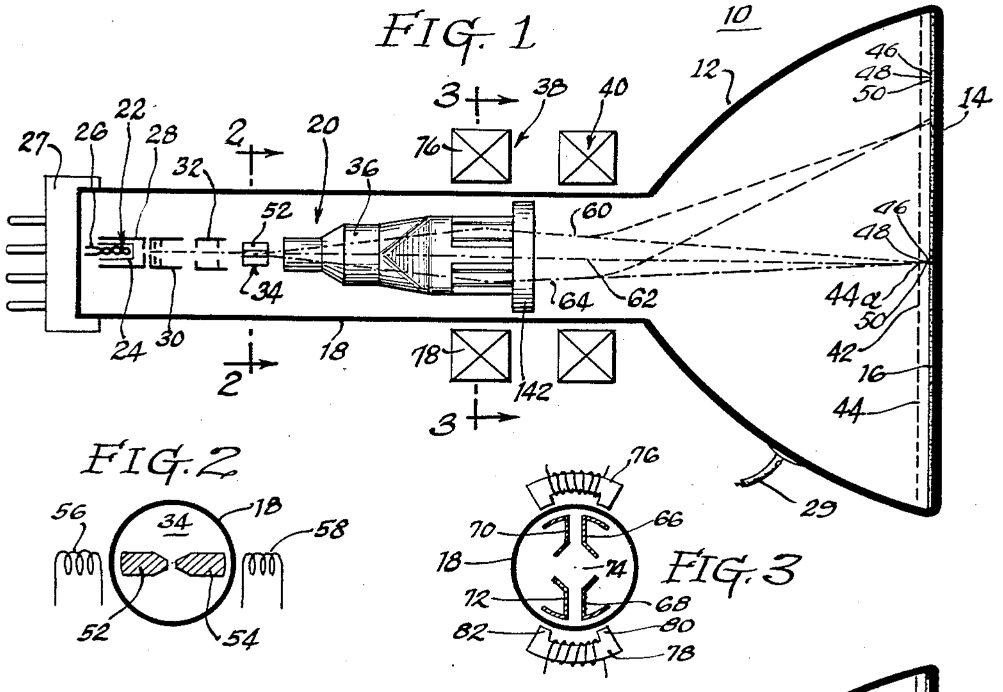
Figure 1 is a diagrammatic illustration of a vertical section of a television tube built in accordance with this invention.
Fig. 2 is a transverse sectional view taken on the line 2—2 of Fig. 1.
Fig. 3 is a transverse sectional view taken on the line 3—3 of Fig. 1.
Figures 4, 5:
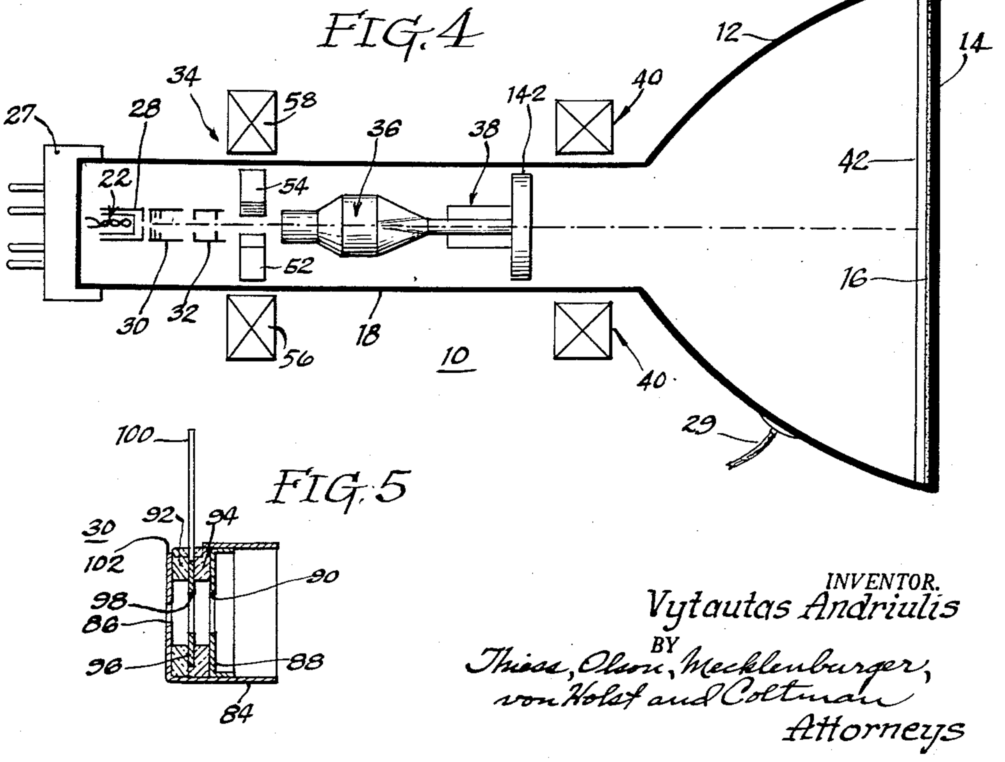
Fig. 4 is a horizontal sectional view of the embodiment of Fig. 1.
Fig. 5 is a detailed illustration of the focusing electrode forming a part of the embodiment of Fig. 1.
Figure 6:
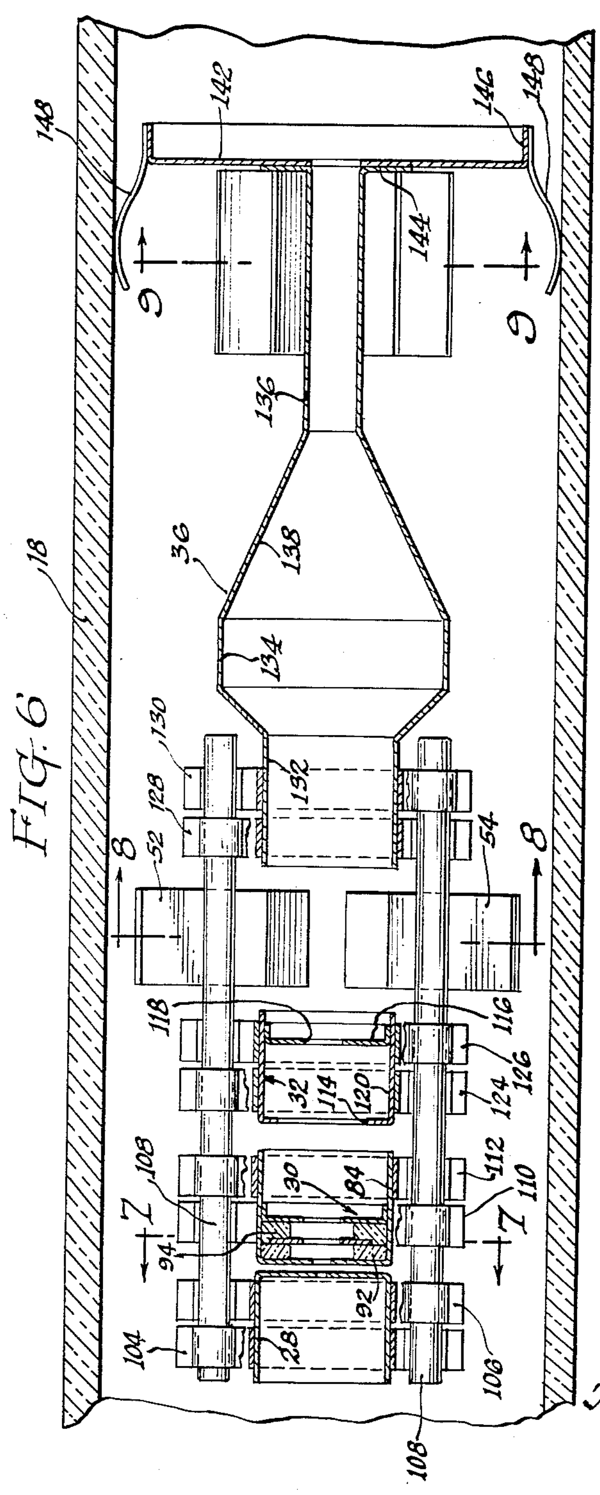
Fig. 6 is an enlarged illustration partially in section of a portion of the embodiment of Fig. 1.
Figure 9:
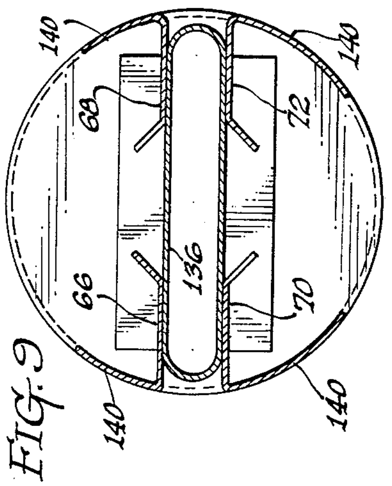
Fig. 9 is a transverse sectional view taken on the line 9—9 of Fig. 6.

Referring now to the drawings and more particularly to Figs. 1 and 4, a television tube 10 capable of reproducing images in color is illustrated. The tube comprises generally a glass envelope 12 having a generally flat face 14 with a phosphorescent coating 16 thereon. It should be clear that the face may be curved to reduce distortion as is well understood in this art. Furthermore, while the envelope is illustrated as formed of a single piece of glass it will be clear that the face will customarily be separately formed and fused to the funnel or conic portion which may in turn be fused to the neck portion 18. As is well understood in this art, the conic portion may be of either glass or metal materials. Disposed in the neck portion 18 of envelope 12 is a source of high velocity electrons generally termed an electron gun 20 which includes a source of electrons 22 including an emissive cathode 24 and a heated filament 26, a control grid or first grid 28, a focusing or second grid 30, a first accelerating anode 32, a high frequency color deflection system 34, a second accelerating anode 36, a second color deflection means 38, and a deflection yoke 40. The filament 26, cathode 24, control grid 28, and focusing assembly 30 may be connected to a conventional multi-pin socket 27. High voltage is applied to the tube through conductor 29 and the surface of the tube may be coated with a conventional conductive film.

A mask 42 is disposed between the phosphorescent screen 16 and the electron gun 20. The mask is preferably quite close to the phosphorescent screen and will have a plurality of apertures therein which will correspond to the distribution of the various colored phosphors on the screen 16. For example, in one preferred embodiment of this invention the mask 42 has a plurality of horizontal slits 44 therein, each slit being in general alignment with three adjacent strips of phosphorescent material 46, 48 and 50.

In accordance with the presently accepted color standards the three strips 46, 48 and 50 will phosphoresce in predetermined hues of red, green and blue. When appropriately excited with an electron beam the strips will luminesce and to the viewer the striations of color will not be visible. As already stated, the present color transmission includes complete continuous signals representing hue and brilliance. However, systems have been proposed in which the signal transmission includes periodic samples of the red, green and blue portions of a scene or picture being transmitted. In the present system of continuous transmission the receiver designer who utilizes a one-gun tube and a sampling technique may sample with any desired periodicity; for example, if a frame sequential system were desired, it would be possible to energize the control grid 28 with complete frames of blue, red and green sequentially. It would then be necessary to similarly energize the color beam deflecting system. Preferably the color switching is more rapid, either line sequential or dot sequential, between the various colors, the only fundamental requirement being that the control grid switching and the color deflection system be properly coordinated. Where a sequential color sampled picture is initially transmitted the switching is, of course, dictated by the transmission.

By properly deflecting and directing the electron beam and sequentially varying the angle from which the beam appears to emanate in accordance with the sampled transmission which is applied to the control grid 28, the mask and phosphorescent screen will cooperate to produce a substantial reproduction of the sampled intelligence at the transmitting station.

In the embodiment illustrated in Figs. 1 and 4 a substantially constant flow of electrons is liberated from the cathode 24. This stream is modulated by the control electrode 28 with a signal representing instantaneous picture increment brilliance. The stream thus modulated is passed through the focusing electrode assembly 30 to form a beam which is accelerated by anode 32. As the beam passes between the electrodes 52 and 54, comprising a part of the first color deflection system 34, it is vertically deflected to form a planar fan-like stream of electrons. As is well understood, as a beam passes through a transverse magnetic field, the electron path is arcuate whereby beam deflection is produced. The electrode configuration of the first color deflection system 34 is more clearly illustrated in Fig. 2. Therein, it can be seen that the pair of spaced electrodes 52 and 54 formed of a high-permeability, low-retentivity material such as sintered zinc ferrite and manganese ferrite in ceramic and the like are aligned with deflection coils 56 and 58. As will be clear from the description that follows the deflection coils 56 and 58 are energized with a periodic signal having a frequency corresponding to the color sampling rate of the system.

As already described, this rate may have many values, the only requirement being that the control grid 28 be correspondingly energized. The color deflection frequency is dependent upon the number of frames per second, the number of lines per frame, and the number of samples per line as dictated by the transmission system or the control grid sampling rate which is in use. The present color television system includes thirty frames per second, 525 lines per frame, and transmits all colors continuously. Thus the repetition rate with which the first color deflection electrodes are energized may be 5250 if the sampling were done in a line sequential manner. If, for example, it is desired to subdivide each line into 200 color dots, the frequency with which coils 56 and 58 are energized is 1.05 megacycles and, of course, the control electrode 28 must sample the three colors at this rate also.

The fan-like stream of electrons then enters the region of final accelerating electrode 36, normally energized with a voltage of between 10,000 and 24,000 volts, and this imparts to the beam its final velocity. As the beam passes the second color deflection means 38, the fan-like beam of electrons is redirected to form a beam convergent at the mask 42. Thus, as the beam passes through the mask, the individual electrons begin to diverge and develop the desired color distribution. If desired, blanking may be applied to the control grid 28 to avoid any color mixing as the beam sweeps from one color segment of the screen to the next. The electrons which follow the broken line path 60 will be deflected downwardly by the second color deflection system 38 whereby they will pass through a typical aperture 44a in the mask 42 whereby the electrons impinge upon the lowermost strip 50 of three associated strips of phosphorescent material. This strip, for example, might produce a red color. Similarly, electrons which were not deflected by the first color system 34 will pass through the center of the gun following the broken line 62 and will pass through the aperture 44a and impinge upon the central phosphorescent strip 48. This might, for example, produce a green color. Additional electrons following the path indicated by broken line 64 will be deflected by the second color deflecting means 38 to follow the rising path focusing at the aperture 44a and impinging upon the upper phosphorescent strip 46. This would in the particular example described produce a blue color.

The deflection yoke 40 may be of a conventional type whereby the electron beam is deflected to produce a raster of lines. The yoke 40 will produce in the particular system described vertical deflection of the electron beams at the rate of 60 cycles per second and will produce horizontal deflection of the beams at the rate of 15,750 cycles per second. This is a conventional deflection system utilizing thirty frames per second of 525 lines per frame with line interlace.

The second color deflection system is illustrated in greater detail in Fig. 3. Therein it can be seen that four pole pieces 66, 68, 70 and 72 are oriented to define a central opening 74 through which the nondeflected electron beam passes. The first color deflection means 34 produces a fan-like beam of electrons which will lie in the vertical opening between the pole pieces 66 and 70 and between the pole pieces 68 and 72. The pole pieces will be of a magnetic material such as magnetic iron or a low-retentivity alloy.

Outside of the envelope 18 a pair of electromagnets 76 and 78 are provided for producing a flux field between the various pole pieces. For example, if the right leg 80 of electromagnet 78 is a north pole and the left leg 82 a south pole, the gap between pole pieces 68 and 72 will have a magnetic field therein wherein pole piece 72 will be a south pole and pole piece 68 a north pole. As is well understood, this will produce deflection of electrons passing through the gap and by proper selection of flux densities and electron velocities the electrons passing therethrough will be properly directed to the center of the tube face 14 when no picture deflection voltages are applied to the deflection yoke 40. The flux in the second color deflection region may be constant or, as required, may be varied at a predetermined low frequency. The pole pieces 66 and 70 and associated magnet 76 function in an identical manner.

Fig. 5 illustrates the focusing electrode which forms one important subcombination in the overall combination described herein. The focusing electrode 30 is disposed in the low voltage region of the picture tube 10 and is energized to produce a highly concentrated beam of relatively low velocity electrons. The electrode 30 comprises three apertured discs through which the electron beam passes. An outer cylinder 84 has a small aperture 86 formed in the closed end thereof and this comprises the first electrode element of the focusing means. A second smaller cylinder 88 is forced into the cylinder 84 and secured therein by any convenient means. The small cylinder 88 has a somewhat larger aperture 90 therein in fixed spaced aligned relationship to the aperture 86.

A pair of insulating annular spacers 92 and 94 having enlarged central apertures therein are disposed between the ends of cylinders 84 and 88 and have an inner recess formed therebetween to receive a central electrode element 96. Electrode element 96 has a central aperture 98 approximately the same size as aperture 90 and aligned therewith whereby a beam of electrons may pass through the aligned apertures 86, 90 and 98. A terminal 100 extends outwardly from the electrode element 96 through a cut-away portion 102 in the outer cylinder 84. Thus, while the cylinders 84 and 88 are electrically common, the central electrode element 96 is electrically isolated therefrom. It has been found that an electrode assembly such as assembly 30 described hereinabove can produce accurate electron beam focusing in the low voltage region whereby improved systems of color deflection and acceleration may be incorporated in a television picture tube.

In one particular embodiment of this invention the cylinders 84 and 88 were energized with a +400 volt D.C. signal and the central electrode element 96 was energized with a variable signal substantially different from the +400 volt value. The particular voltage to be applied to the central electrode element 96 will be determined by the particular configuration, accelerating potentials and the like.

Figure 7:
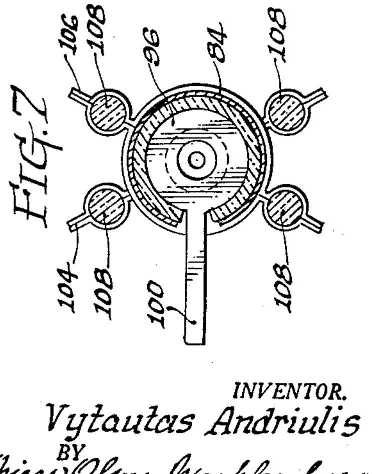
Fig. 7 is a transverse sectional view taken on the line 7—7 of Fig. 6.

Referring now to Figs. 6, 7, 8, and 9 the structural details of one particular electron gun constructed in accordance with this invention are illustrated. The gun is rigidly mounted within the neck 18 of glass envelope 12. The cathode or source of electrons is not illustrated but may be of any conventional type available to one skilled in this art. The cathode will be fixed to the tube base and the various electrodes and elements illustrated in Figs. 6, 7, 8 and 9 will be secured to the cathode. The control electrode 28 is a hollow cylinder and may be a cylinder identical to the outer cylinder 84 of the focusing electrode. A pair of clamps 104 and 106 are secured to the control electrode 28 and engage four insulating rods 108. The manner in which the clamps engage the control electrode 28 and the insulating rods 108 is illustrated in Fig. 7. The insulating rods 108 are not spaced in quadrature for a reason which will be apparent in the discussion to follow. A similar technique is employed in mounting the focusing electrode 30. A pair of clamps 110 and 112 are secured to the outer cylinder 84 and engage the insulating rods 108. The rods 108 may be of various ceramic materials.

The first accelerating anode 32 includes a cylinder 120 similar to the cylinder 84 differing therefrom only in the inclusion of a substantially enlarged central aperture 114. A second web 116 is disposed within the anode cylinder 120 and has a central aperture 118 therein, the web 116 being in predetermined spaced relationship to the end portion of the cylinder 120. The first anode 120 is supported on a pair of clamps 124 and 126 similar to the clamps already described.

The first color deflection pole pieces 52 and 54 are mounted in spaced relationship to the first anode 32 and are supported between the adjacent insulating rods 108. The manner of mounting pole pieces 52 and 54 is more clearly illustrated in Fig. 8. The rods 108a and 108b engage semi-cylindrical recesses formed in pole piece 52 whereby the pole piece is accurately positioned with a pole face 121 disposed immediately adjacent to the central axis of the envelope. Similarly, the pole piece 54 has a pair of parallel semi-cylindrical recesses therein which receive the insulating rods 108c and 108d and thereby the pole face 122 is maintained in spaced parallel relationship with face 121 and is also spaced from the central axis of the envelope 12. Thus, as the electron beam passes between the pole faces 121 and 122, the individual electrons follow an arcuate path producing the fan-like beam already described.

Figure 8:
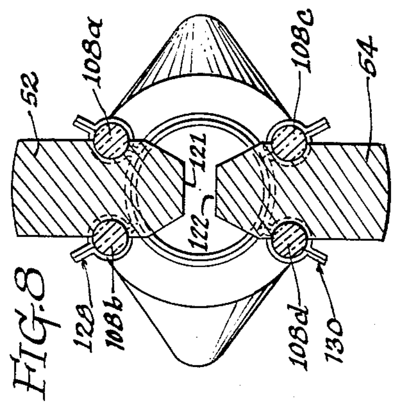
Fig. 8 is a transverse sectional view taken on the line 8—8 of Fig. 6.

The second anode 36 is supported in spaced relationship to pole pieces 52 and 54. A pair of clamps 128 and 130 are rigidly secured to the reduced cylindrical portion 132 of the second anode 36 and clamps 128 and 130 in turn engage rods 108 as illustrated in Fig. 8. The second anode 36 has an enlarged cylindrical portion 134 immediately adjacent to the cylindrical portion 132, and the enlarged cylindrical portion 134 has its outermost end 136 flattened to form an intermediate semi-conical configuration 138. The cross section of the flattened portion 136 is clearly illustrated in the sectional view, Fig. 9. The second anode 36 is constructed of a nonmagnetic material, while the second color deflection pole pieces 66, 68, 70 and 72 which are secured thereto are of a high-permeability, low-retentivity material. The pole pieces are formed with outer arcuate portions 140 which are immediately adjacent to the neck portion of envelope 12. Thus, a magnetic circuit is provided between the pole pieces and the magnets 76 and 78 of minimum reluctance and consequently of optimum efficiency. An outer disc 142 is preferably secured to a flange 144 formed on the end of second anode 36. The disc 142 may be secured in any conventional way, such as by spot welding. The disc 142 has a peripheral flange 146 formed thereabout to which a plurality of flat resilient springs 148 are secured. The springs 148 engage the inner periphery of envelope neck 18 whereby the gun 20 is maintained in position within the envelope while exhibiting sufficient flexibility to withstand unusual shock or vibration. Thus, in Fig. 6, the necessary elements for focusing, accelerating, and color deflection are clearly illustrated and described. The deflection yoke necessary for producing a picture raster, the mask, and phosphorescent screen are not illustrated in Fig. 6. However, the adaptation of these elements to the new improved electron gun described herein may be performed by one skilled in this art.

While one particular embodiment of this invention has been described in great detail, it will be apparent that one skilled in this art may adapt the teaching of this invention to various cathode ray tubes for use in many industrial, commercial, and entertainment fields. For example, the focusing electrode assembly in the low-voltage region of the illustrated embodiment of this invention may be incorporated in various electrode guns and the planar color deflection system described herein may be incorporated in many cathode ray tubes utilizing various electron sources, focusing and accelerating apparatus. Also, while the mask 42 described above is a mechanical mask having a plurality of spaced transverse slits, an electrostatic mask formed of a plurality of parallel spaced grid wires at a voltage below the anode voltage, for example, will function equally well.

Without further elaboration, the foregoing will so fully explain the character of my invention that others may, by applying current knowledge, readily adapt the same for use under varying conditions of service, while retaining certain features which may properly be said to constitute the essential items of novelty involved, which items are intended to be defined and secured to me by the following claims.

I claim:

1. A television picture tube comprising an evacuated envelope having a light-emissive screen responsive to electron bombardment and a generally cylindrical portion having a longitudinal axis aligned with a central portion of said screen, an electron emissive cathode mounted adjacent the end of said cylindrical portion substantially on said axis, a centrally apertured control electrode spaced from said cathode, focusing electrode means spaced from said control electrode, a first anode comprising a centrally apertured cylinder adjacent said focusing means and aligned with said longitudinal axis to direct a stream of electrons from said cathode along a path toward said screen, aligned magnetic pole pieces extending diametrically across said cylindrical portion of said envelope and defining a magnetic gap to produce a transverse field of substantially parallel magnetic lines across said path, second anode means comprising a tubular element aligned with said longitudinal axis, and spaced magnetic pole elements adjacent said second anode defining a generally planar gap normal to the axis of said aligned pole pieces whereby a substantially transverse magnetic field is created therebetween.

2. In a television picture tube including an evacuated envelope having a light-emissive screen responsive to electron bombardment, a source of electrons, a control electrode spaced from said source, and focusing and accelerating electrode means aligned between said control electrode and said screen to define an electron beam path between said source and said screen, an improved deflection system comprising aligned spaced magnetic pole pieces extending diametrically across said envelope and defining a magnetic gap to provide a transverse field of substantially parallel lines across said beam path whereby said beam is deflected to form a planar pattern, and spaced magnetic pole elements intermediate said pole pieces and said screen defining a generally planar gap including said beam path and said planar pattern providing a transverse pattern of substantially parallel lines normal to said planar pattern whereby said planar pattern is deflected toward said beam path.

3. The television picture tube combination of claim 2 wherein raster forming deflection means are disposed between said deflection system and said screen along said beam path.

4. The television picture tube combination of claim 3 wherein said pole elements comprise two pair of spaced magnetizably elements, each pair defining a planar gap therebetween aligned with said planer pattern, said pairs being diametrically opposed with respect to said beam path.

5. The television picture tube combination of claim 4 wherein said spaced magnetizable elements provide a substantially constant magnetic field between said pairs respectively.

6. In a television picture tube including an evacuated envelope having a light-emissive screen responsive to electron bombardment, a source of electrons, a control electrode spaced from said source, and focusing and accelerating electrode means aligned between said control electrode and said screen to define an electron beam path between said source and said screen, an improved deflection system comprising aligned spaced deflection means defining a gap to provide a transverse field of substantially parallel lines across said beam path whereby said beam is deflected (to form a planar pattern), spaced magnetic pole elements intermediate said deflection means and said screen defining a generally planar gap including said beam path and said planar pattern providing a transverse pattern of substantially parallel lines normal to said planar pattern whereby said planar pattern is deflected toward said beam path, and raster forming deflection means disposed between said deflection system and said screen along said beam path.

7. In a television picture tube including an evacuated envelope having a light emissive screen responsive to electron bombardment, a source of electrons, a control electrode spaced from said source, and focusing and accelerating electrode means aligned between said control electrode and said screen to define an electron beam path between said source and said screen, an improved deflection system comprising aligned spaced deflection means defining a gap to provide a transverse field of substantially parallel lines across said beam path whereby said beam is deflected to form a fan-like planar pattern, deflection elements intermediate said deflection means and said screen defining a gap encompassing said planar pattern including said beam path and said planar pattern providing a transverse pattern of substantially parallel lines normal to said planar pattern whereby said deflection elements when energized to produce a substantially constant field deflect said planar pattern toward said beam path, and raster forming deflection means disposed between said deflection system and said screen.

8. A television picture tube comprising an evacuated envelope having a light-emissive screen responsive to electron bombardment and a cylindrical portion having a longitudinal axis aligned with the central portion of said screen, an electron emissive cathode mounted adjacent the end of said cylindrical portion substantially on said axis, a centrally apertured control electrode spaced from said cathode, a focusing electrode assembly spaced from said control electrode and comprising three spaced centrally apertured elements, a first anode comprising a centrally apertured cylinder adjacent said focusing assembly and aligned with said longitudinal axis, aligned magnetic pole pieces extending diametrically across said cylindrical portion of said envelope and defining a magnetic gap substantially at the axis thereof, second anode means comprising a tubular element aligned with said longitudinal axis, and spaced magnetic pole pieces adjacent said second anode defining a planar gap normal to the axis of said aligned pole pieces.

9. A television picture tube comprising an evacuated envelope having a light-emissive screen responsive to electron bombardment and a cylindrical portion having a longitudinal axis aligned with the central portion of said screen, an electron emissive cathode mounted adjacent the end of said cylindrical portion substantially on said axis, a centrally apertured control electrode spaced from said cathode, a focusing electrode assembly spaced from said control electrode and comprising three spaced centrally apertured elements, a first anode comprising a centrally apertured cylinder adjacent said focusing assembly and aligned with said longitudinal axis, aligned magnetic pole pieces extending diametrically across said cylindrical portion of said envelope and defining a magnetic gap substantially at the axis thereof, second anode means comprising a tubular element aligned with said longitudinal axis, spaced magnetic pole pieces adjacent said second anode defining a planar gap normal to the axis of said aligned pole pieces, and mask means adjacent said screen and defining a plurality of elongate electron passages parallel to the axis of said aligned magnetic pole pieces, said screen having a plurality of adjacent elongate strips of luminescent material parallel to said electron passages.

10. A television picture tube comprising an evacuated envelope having a light-emissive screen responsive to electron bombardment and a cylindrical portion having a longitudinal axis aligned with the central portion of said screen, an electron emissive cathode mounted adjacent the end of said cylindrical portion substantially on said axis, a centrally apertured control electrode spaced from said cathode, a focusing electrode assembly spaced from said control electrode and comprising three spaced centrally apertured elements, a first anode comprising a centrally apertured cylinder adjacent said focusing assembly and aligned with said longitudinal axis, aligned magnetic pole pieces extending diametrically across said cylindrical portion of said envelope and defining a magnetic gap substantially at the axis thereof, second anode means comprising a tubular element aligned with said longitudinal axis, and spaced magnetic pole pieces adjacent said second anode defining a planar gap normal to the axis of said aligned pole pieces, and mask means adjacent said screen and defining a plurality of elongate electron passages parallel to the axis of said aligned magnetic pole pieces, said screen having three adjacent elongate strips of luminescent material parallel and associated with each of said electron passages, each of said strips luminescing in a different predetermined color.

References Cited in the file of this patent

UNITED STATES PATENTS

| | | |
|---|---|---|
| 2,199,540 | Diels | May 7, 1940 |
| 2,267,083 | De Gier | Dec. 23, 1941 |
| 2,409,514 | Pratt | Oct. 15, 1946 |
| 2,510,267 | Tolson | June 6, 1950 |
| 2,581,487 | Jenny | Jan. 8, 1952 |
| 2,711,493 | Lawrence | June 21, 1955 |
| 2,752,520 | Morrell | June 26, 1956 |
| 2,769,116 | Koda | Oct. 30, 1956 |
| 2,784,341 | Huffman | Mar. 5, 1957 |
| 2,803,781 | Jurgens | Aug. 20, 1957 |